Sept. 3, 1935.  J. P. HUBBELL  2,013,464
LIQUID DISPENSING APPARATUS
Filed Oct. 20, 1933   4 Sheets-Sheet 1
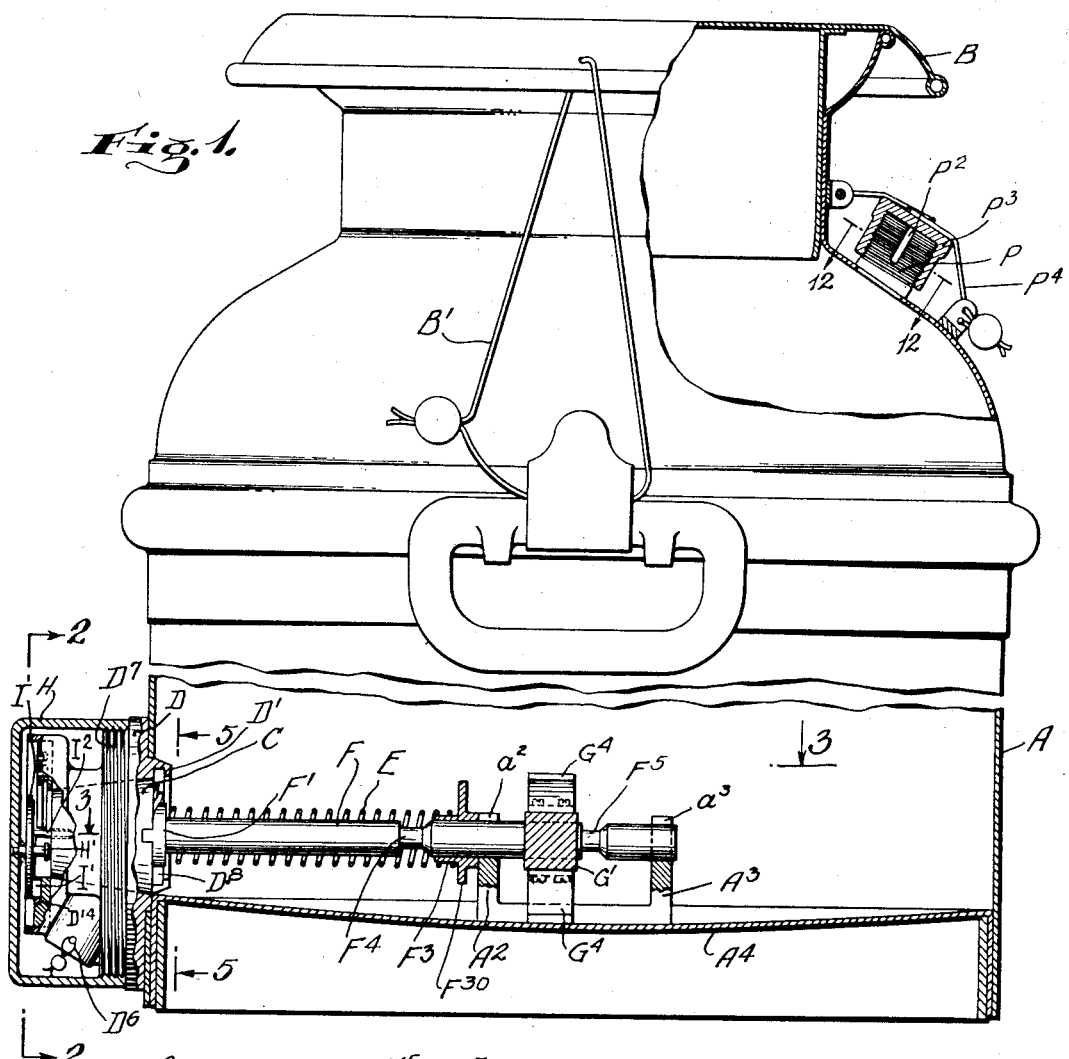
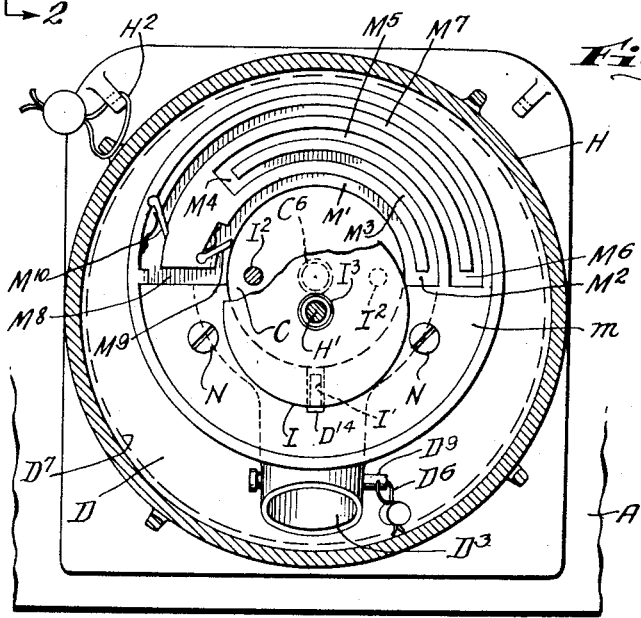
INVENTOR.
JESSE P. HUBBELL
BY John E. Hubbell
ATTORNEY Sept. 3, 1935. J. P. HUBBELL 2,013,464
LIQUID DISPENSING APPARATUS
Filed Oct. 20, 1933    4 Sheets-Sheet 2
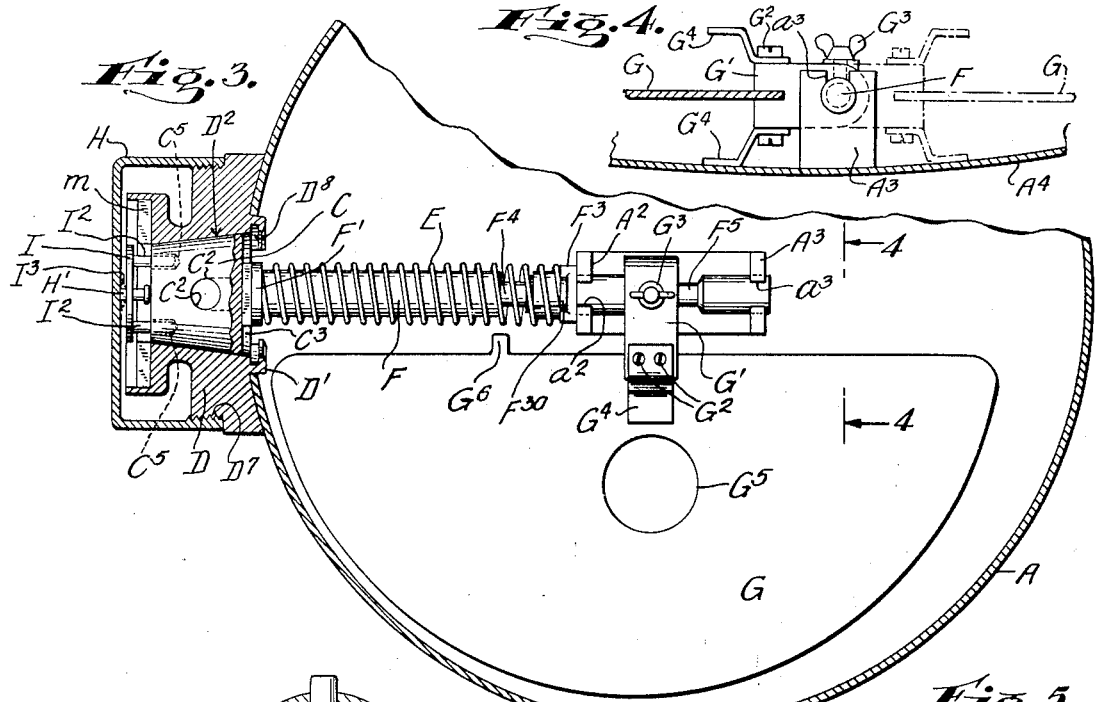
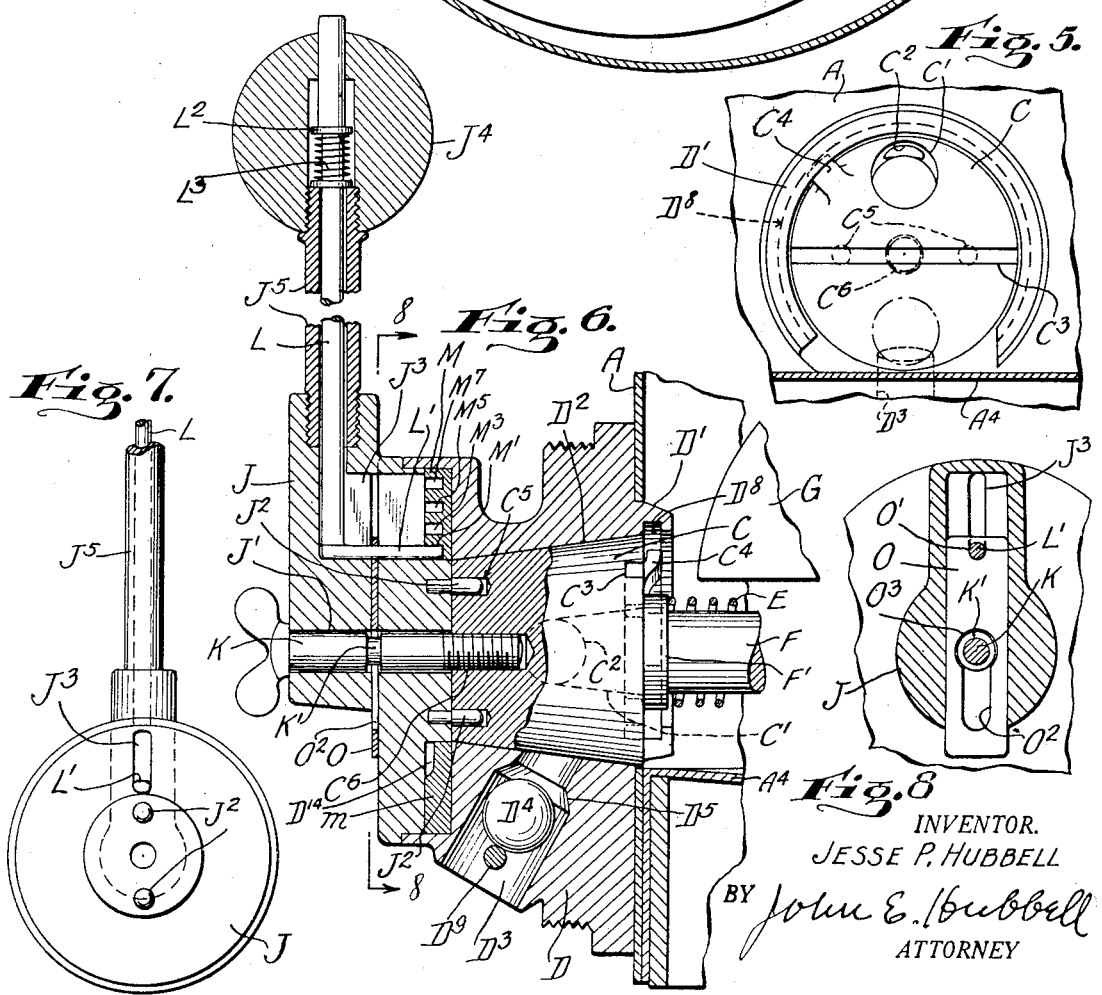
INVENTOR.
JESSE P. HUBBELL
BY John E. Hubbell
ATTORNEY Sept. 3, 1935.  J. P. HUBBELL  2,013,464
LIQUID DISPENSING APPARATUS
Filed Oct. 20, 1933  4 Sheets-Sheet 3
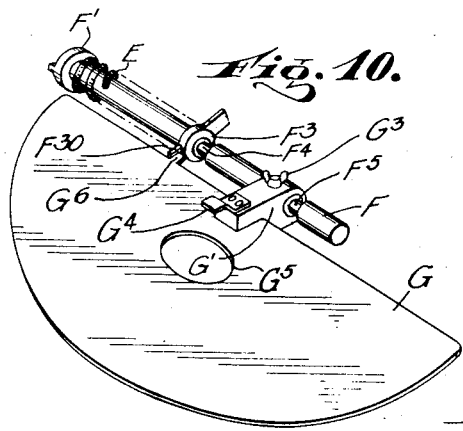
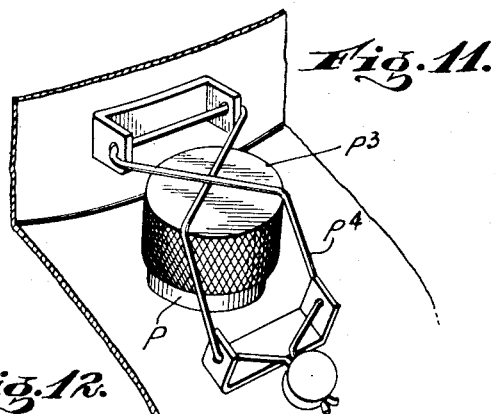
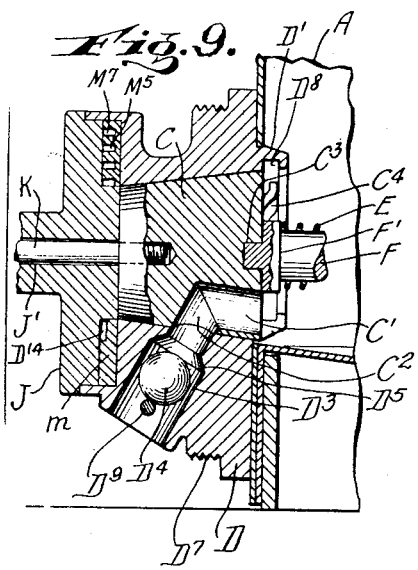
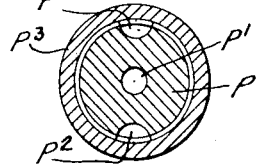
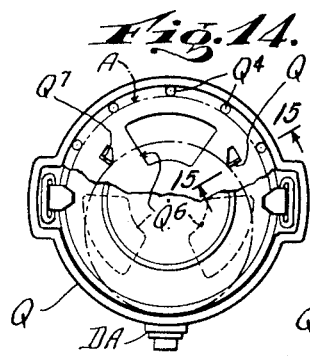
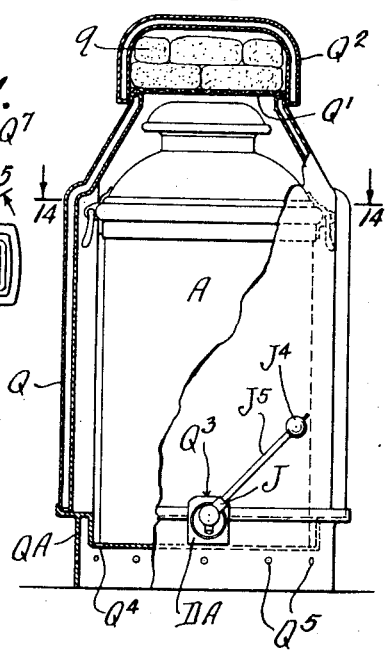
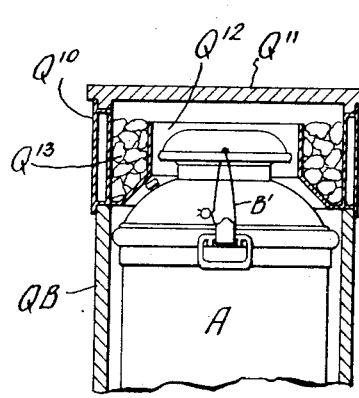
INVENTOR.
JESSE P. HUBBELL
BY John E. Hubbell
ATTORNEY.

Sept. 3, 1935.  J. P. HUBBELL  2,013,464
LIQUID DISPENSING APPARATUS
Filed Oct. 20, 1933  4 Sheets-Sheet 4
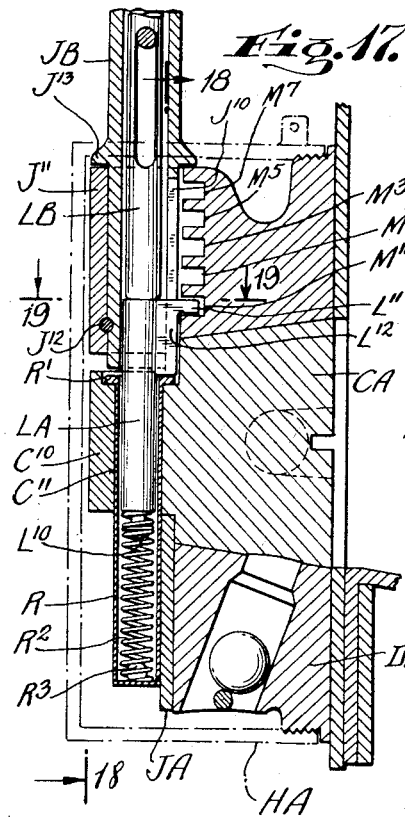
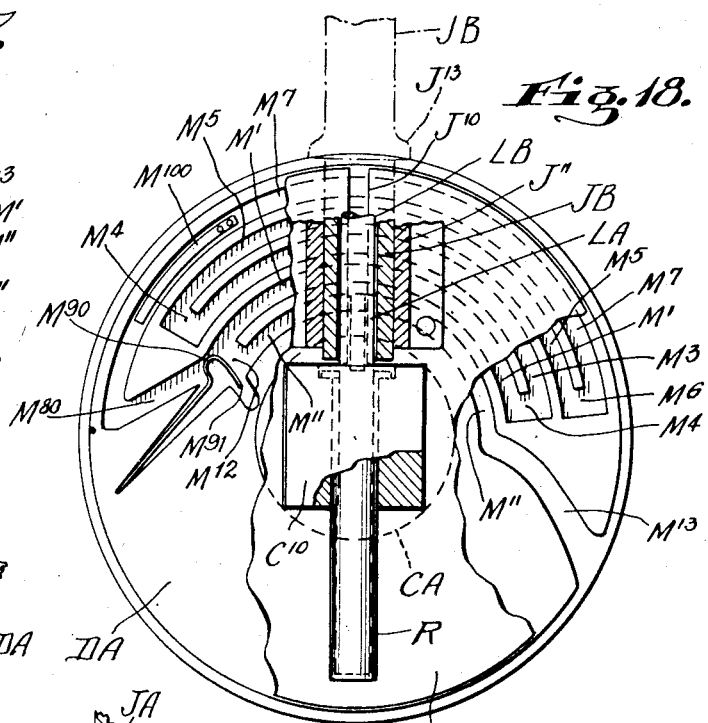
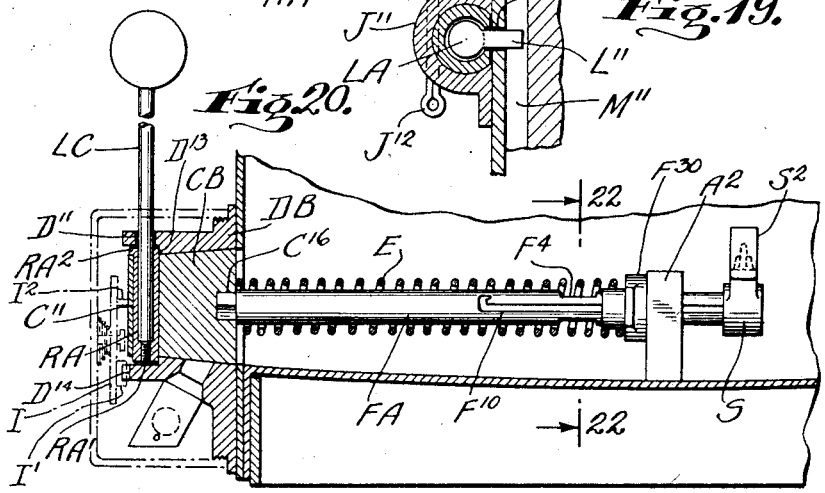
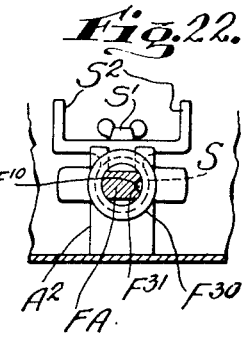
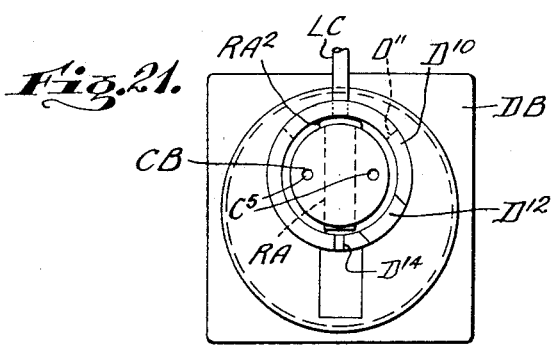
INVENTOR
JESSE P. HUBBELL
BY
ATTORNEY

/ 222. DISPENSING.
131

Patented Sept. 3, 1935

2,013,464

UNITED STATES PATENT OFFICE 2,013,464

LIQUID DISPENSING APPARATUS

Jesse P. Hubbell, Fanwood, N. J.

Application October 20, 1933, Serial No. 694,415

26 Claims. (Cl. 221—67)

The general object of the present invention is to provide improved liquid dispensing apparatus of the type comprising a container and a valve opened and closed to intermittently discharge the container contents. The invention was primarily devised and is especially adapted for use in dispensing milk.

As a result either of legal requirements or of trade or user demands, it is desirable in many cases to dispense milk under conditions requiring dairies and wholesalers to maintain filling stations with competent and reliable superintendence, subject in many cases to strict governmental supervision, and charged with the responsibility of cleaning and filling milk cans for transportation to dealers or retail distributors who dispense milk in quantities which are small fractions of the capacity of a single shipping can. By such procedure the retail distributor is relieved from practically all responsibility in respect to the quantity and quality of milk contained in each shipping can received by him, and is restrained from practices which might interfere with or defeat the purposes of the care and sanitary supervision exercised at the filling station, all to the end that the ultimate user may be supplied with milk of the grade purchased, subject to minimum deterioration and variation in quality. A specific object of the present invention is to provide a milk can of simple and reliable construction and especially adapted for use under the condition last mentioned.

In dispensing ordinary milk from a container in small portions successively withdrawn through a discharge valve, it is desirable that the milk in the container be thoroughly agitated preparatory to the discharge of each such portion, so that the composition of each portion discharged may be approximately of the average composition of the total milk content of the container, notwithstanding the tendency of the cream constituents of the milk to collect at the top of the body of milk in the container, and a specific object of the invention is to provide simple and effective means for compelling such agitation by the dispenser prior to each discharge operation.

The invention comprises various novel features of construction and arrangement devised for the general purposes mentioned above, and for the further purposes of facilitating the cleaning of the milk contacting parts of the container, and of guarding against maladjustment of parts, and against the wastage of the liquid as a result of shocks, jars or abnormal position to which containers are subject in transportation and handling.

While main features of the present invention were devised primarily for use in dispensing milk under conditions mentioned above, some features of the invention are adapted for use in dispensing liquids other than milk, and under conditions mentioned above, and, in particular, in dispensing liquids which do not require agitation as a prerequisite to the discharge of any portion of the container contents.

The various features of novelty which characterize my invention are pointed out with particularity in the claims annexed and form a part of this specification. For a better understanding of the invention, however, its advantages and specific objects obtained with its use, reference should be had to the accompanying drawings and described matter in which I have illustrated various forms of embodiment of the invention.

Of the drawings:

Fig. 1 is an elevation with parts broken away and in section of a milk can embodying one form of the present invention;

Fig. 2 is a section on the line 2—2 of Fig. 1;

Fig. 3 is a plan view partly in section on the line 3—3 of Fig. 1;

Fig. 4 is a partial section on the line 4—4 of Fig. 5;

Fig. 5 is a partial section on the line 5—5 of Fig. 1;

Fig. 6 is an elevation, partly in section, of a portion of the apparatus shown in Fig. 1 in its dispensing condition;

Fig. 7 is an elevation of a portion of the dispensing apparatus shown in Fig. 6;

Fig. 8 is a partial section on the line 8—8 of Fig. 6;

Fig. 9 is an elevation in section of a portion of the apparatus shown in Fig. 6, with the discharge valve shown in its discharge position;

Fig. 10 is a perspective view of the agitator and a portion of its operating mechanism adjusted into a different condition from that shown in Fig. 3;

Fig. 11 is a perspective view of an air inlet portion of the container;

Fig. 12 is a section on the line 12—12 of Fig. 1;

Fig. 13 is an elevation with parts broken away and in section, illustrating the construction and use of a milk can cooling or refrigerating device;

Fig. 14 is a section on the line 14—14 of Fig. 13;

Fig. 15 is a partial section on the line 15—15 of Fig. 14;

Fig. 16 is an elevation partly in section illustrating cooling means differing in character from those shown in Fig. 13;

Fig. 17 is a partial sectional elevation taken similarly to Fig. 6, but illustrating a modified construction;

Fig. 18 is a section on the line 18—18 of Fig. 17;

Fig. 19 is a partial section on the broken line 19—19 of Fig. 17;

Fig. 20 is an elevation of a modified form of dispensing valve operating and mounting means;

Fig. 21 is an end elevation of parts shown in Fig. 20; and

Fig. 22 is a partial section on the line 22—22 of Fig. 20.

In the form of the invention shown in Figs. 1-12 A is a milk can having a top B providing a plug closure for the top opening in the can, and having a discharge valve C adjacent its bottom. Except for the valve C and associated parts and an air inlet arrangement hereinafter described, the milk can A may be of the general type, form and capacity of five or ten gallons, now customarily employed in transporting and dispensing milk. By virtue of its inclusion of the valve C and associated parts and the above mentioned air inlet, the milk can A is well adapted for use under conditions requiring the can to be properly cleaned and filled at a filling station, the transportation of the filled container, and the intermittent discharge of its contents by a retailer or retail distributor who is prevented from access to the interior of the can and is required to agitate the can contents preparatory to each discharge of any portion thereof.

As shown, the valve C is a tapered plug cock mounted in a valve casing member D anchored against the outer side of the milk can though comprising a portion D' extending circumferentially about the tapered valve chamber $D^2$ receiving the valve C which projects into the can. The valve C, as shown in Fig. 9, is formed with a discharge passage including a longitudinal extending portion C' laterally displaced from the valve axis, and including a radially extending portion $C^2$ which in the discharge position of the valve C registers with the upper end of a discharge passage $D^3$ formed in the valve casing member D. Preferably as shown, the passage $D^3$ leads downwardly from the chamber $D^2$ and is inclined away from the outer wall of the can A. To prevent unauthorized refilling of the can through the passage $D^3$, a ball valve $D^4$ is mounted in the chamber $D^2$ and adapted when the can is turned upside down to engage a valve seat $D^5$ formed at the margin of a reduced portion of the passage $D^3$ adjacent the chamber $D^2$ and thereby close said passage. The ball valve $D^4$ is held against unauthorized removal by a pin $D^9$ extending across the lower portion of the passage $D^3$ and secured in place by a seal wire $D^6$ which may be put in place when the can is filled and may be broken when the can is returned to the filling station for refilling to then permit the removal of the pin and valve $D^4$ for cleaning. The cover B is also secured against unauthorized removal by a seal B' normally put in place and broken only at the filling station.

Preferably and as shown, the large diameter end of the plug valve C is adjacent the can interior, so that the valve must be withdrawn from the valve chamber $D^2$ into the can interior when the valve is removed for cleaning. Normally the valve is spring held against its seat by valve mounting means including a helical spring E, and acting on the latter through a shaft F, which is coaxial with the valve and is surrounded by the spring E. The shaft F serves the double purpose of a valve mounting device normally tending to press the tapered plug valve into contact with the wall of the valve chamber $D^2$, and as a means for oscillating an agitator G when the valve C is oscillated. As shown the shaft F is formed at its valve engaging end with an enlarged head F' against the inner side of which the corresponding end of the spring E bears. The shaft F is normally coupled to the valve by means shown as comprising a key rib formed on the shaft head F' and extending diametrally of the valve and entering a corresponding slot $C^3$ formed in the end of the latter. In the normal condition of the apparatus, the shaft F is journaled in bearings formed in two spaced apart posts $A^2$ and $A^3$ secured to and extending upward from the bottom wall $A^4$ of the can at opposite sides of the can axis. The spring E normally extends between the head F' and a thrust collar $F^3$ slidingly mounted on the shaft F and normally bearing against the post $A^2$. The shaft F comprises two spaced apart portions $F^4$ and $F^5$, respectively, of reduced cross section and similarly displaced toward the valve from the posts $A^2$ and $A^3$ in the normal condition of the apparatus. By longitudinal movement of the shaft F to the right from the normal position shown in Fig. 1, the cut away portions $F^4$ and $F^5$ of the shaft are brought into register with openings $a^2$ and $a^3$ in the upper end of the shaft bearings in the posts $A^2$ and $A^3$, respectively, and of a width, as shown in Fig. 4, smaller than the diameter of the body portion of the shaft F but large enough to permit the passage of the reduced portions $F^4$ and $F^5$ of the shaft. When the shaft is thus longitudinally adjusted to bring its reduced portions $F^4$ and $F^5$ into register with the openings $a^2$ and $a^3$, the shaft F may be disconnected from the can and removed for cleaning purposes and the valve C may also be moved into the can and out of the latter for cleaning.

The agitator G in the form shown, is a metal plate in the form of a segment of a circle so that when horizontally disposed it extends nearly across one half of the section of the can. As shown the agitator plate is secured to the shaft F through an arm G' secured to the agitator blade by screws $G^2$ and formed with an opening receiving a portion of the shaft F between its reduced portions $F^4$ and $F^5$ and normally secured to the shaft as by means of a thumb screw $G^3$. As shown the agitator is so shaped and disposed to permit the axial adjustment of shaft F necessary to bring the reduced shaft portions $F^4$ and $F^5$ into register with the openings $a^2$ and $a^3$, without loosening the thumb screw $G^3$. As shown the screws $G^2$ also serve to attach to the agitator at its opposite sides, spring arms $G^4$, one or the other of which engages the can bottom $A^4$ and thereby limits the oscillating movement of the agitator as the latter is turned in one direction or the other. The agitator blade may well be formed with one or more openings $G^5$. The spring E may be rendered inoperative to serve its normal purpose of opposing longitudinal movement of the shaft F to the right as seen in Fig. 3, by adjusting the collar $F^3$ bodily towards the valve against the tension of the spring E, and then rotating the collar $F^3$ to bring a projection $F^{30}$ of the latter into engagement with an agitator lug or shoulder $G^6$ as shown in Fig. 10. This locks the spring E in a compressed condition so that the tension of the spring does not interfere with the bodily removal of the shaft F, spring E and agitator G as a unit.

In its normal operative condition, the valve C is not only spring held against its seat, but is also positively locked against movement into the can. This locking action is secured by means of a projection $C^4$ extending radially outward from the inner end of the body of the valve into a groove $D^8$ formed in the valve casing portion D' which is extended into the can for the purpose. The groove $D^8$ which is open at its inner edge extends about the valve axis far enough to engage with the finger $C^4$ while the valve is in any position into which the spring arms $G^4$ permit it to be adjusted in the normal assembly of the apparatus. When the agitator is removed, however, the valve may be rotated to move the projection $C^4$ out of the groove $D^8$ into the space between its two ends, and the valve C may then be moved into the can.

In the transportation condition of the can, the outer end of the valve C and certain operating parts shortly to be described are enclosed and protected against injurious contact by a cap member H screwed onto a threaded portion $D^7$ of the part D, and the valve C may advantageously be locked against rotation into its open position. The locking means shown for this purpose in Figs. 1, 2 and 3 comprises a member I shown as of disc form and loosely journaled on a pin H' carried by the cap member H and coaxial with the latter. When in its locking condition the member I is held against rotative movement by a radial projection I' from the member I, then received in a groove or recess $D^{14}$ formed in the outer end of the member D. Each of one or more projections $I^2$ of the member I then enters a corresponding socket $C^5$ formed in the outer end of the valve C and parallel to but radially displaced from the axis of the valve, which is thereby locked against rotation. The member I is longitudinally movable on the pivot H' and a spring $I^3$ acting between the cap H and the adjacent side of the member I, tends to hold the latter against enlarged head of the pivot H', but yields to permit the cap member H to be moved into engagement with the threaded portion $D^7$, without requiring that the part I be first disposed so that the finger I' enters in the recess $D^{14}$ and the pins $I^2$ enters—the valve sockets $C^5$. Such entry is effected automatically however by an initial rotation of the member H, since the spring $I^3$ acts as a frictional driving connection between the members H and I, causing the member I to rotate with the member H unless positively held against such rotation.

In the transportation condition of the apparatus the member H is locked against unauthorized removal in transit as by a seal wire $H^2$ passing through apertures on the members H and D as shown in Fig. 2. This seal must be broken by the retail distributor to enable the latter to remove the member H and connect operating means to the valve C. In the form of the invention shown in Figs. 1 to 12, the valve operating means provided for the use of the retail distributor comprises a lever J having a hub portion formed with a passage J' for a thumb screw or bolt K, which in the operative condition of the apparatus has its threaded inner end screwed into a threaded socket $C^6$ in the outer end of the valve C and coaxial with the latter. The hub portion of the lever has pin projections $J^2$ which enter the valve sockets $C^5$. The lever J comprises a tubular handle portion $J^5$ shown as threaded into a radial socket formed in the hub portion of the lever and extending radially away from the axis of the valve C and terminating at its outer end in a ball $J^4$ for hand engagement. With the described arrangement and with the parts assembled as shown in Fig. 6, the oscillation of the lever about the valve axis between suitable limits will adjust the valve between its closed positions shown in Figs. 3 and 6, and its open position shown in Fig. 9.

In the form of the invention shown in Figs. 1–12, means are provided for compelling the oscillation of the valve and thereby of the agitator G back and forth for a predetermined number of times through a substantial arc of movement before the valve after being closed, may be reopened. The means shown for this purpose comprise a member L sharing the oscillating movement of the lever and entering a labyrinth channel carried by the member D. The member L comprises a rod or bar body sliding in and extending through the handle portion of the lever J and a transversely extending portion L' partially received in a radially extended recess $J^3$ in the hub portion of the lever J and projecting out of the recess into position in which it extends into the labyrinth channel which comprises sections $M^1$—$M^8$. The labyrinth channel might be formed in the outer end of the member D, but in the construction of Figs. 1–12, it is shown as formed in a disk like part m, which may be machined separately from the part D and is then anchored to the latter as by screws N.

The labyrinth passage sections $M^1$, $M^3$, $M^5$ and $M^7$ are concentric arcs, and sections $M^2$, $M^4$, $M^6$, and $M^8$ are shown as radial. The radial passage $M^2$ connects one end of the passage $M^1$ to the adjacent end of the passage $M^3$. The opposite end of the latter is connected by the radial passage $M^4$ to the adjacent end of the passage $M^5$. The opposite end of the latter is connected by the radial passage $M^6$ to the adjacent end of the passage $M^7$. The opposite end of the passage $M^7$ is connected by radial passage $M^8$ to end of the passage $M^1$ remote from the passage $M^2$. The intermediate arc shaped passages $M^3$, $M^5$ and $M^7$ are of the same angular extent and the radial passages $M^2$ and $M^6$ are in alignment. The inner and outer passages $M^1$ and $M^7$ respectively are longer than the intermediate arc shaped passages so that the radial passage $M^8$ is displaced counterclockwise, as seen in Fig. 2, from the passage $M^4$.

The various sections of the labyrinth passage are so disposed that the valve discharge passage $C^2$ will be in full register with the discharge passage $D^3$ as shown in Fig. 9, only when the finger L' of the member L is in the radial passage $M^3$, and the valve passage $C^2$ will be entirely out of register with the discharge passage $D^3$ when the finger L' is in any portion of the labyrinth passage not at the counterclockwise side of the passage $M^4$ as seen in Fig. 2. In the assembly and adjustment of the can and its parts at the filling station preparatory to the shipment of the filled can, the valve C is necessarily put in its closed position corresponding to that requiring the projection of the finger L' to enter labyrinth section M' adjacent to inner end of the radial passage $M^4$ in order that the pins $I^2$ may enter the socket openings $C^5$ in the valve.

The retail distributor is prevented from attaching the lever J to the valve C except when the finger L' is entered in the passage $M^1$ by a locking part O. The latter is mounted for radial movement in the hub portion of the lever J and is formed at one end with an aperture O' through which the finger L' extends, and is formed with a slot O² for the passage of the bolt or thumb screw K by which the lever is attached to the end of the valve. The body portion of the slot O² is narrower than the diameter of the body portion of the bolt K, but is wide enough to receive a portion K' of reduced cross section which is in the plane of the part O when the bolt K is screwed home in the valve socket C⁶ as shown in Fig. 6. With the bolt projecting out of the passage J' as it normally will during the connection of the lever J to the valve C, the member O must occupy the position shown in Fig. 6 in which the finger L' is at the inner limit of its movement, in order that the bolt may be advanced through the enlarged portion O³ of the slot O² at one end of the latter as shown in Fig. 8.

With the handle attached and in its normal initial position, as described, in which the finger L' is entered in the labyrinth section M', the lever J cannot be turned in the counterclockwise direction as seen in Fig. 2 far enough to open the valve because of a spring detent M⁹ which prevents movement of the projection L' in the counterclockwise direction through the portion of the section M' at the left of the section M⁴ as seen in Fig. 2. In consequence the valve C can only be opened as a result of oscillatory movements of the lever J carrying the finger L' successively through the channels M¹, M², M³, M⁴, M⁵ and M⁶ into the channel M⁷ and through the latter far enough to force the spring detent M¹⁰ out of its normal position in which it extends across the channel M⁷ and prevents counterclockwise movement therein of the finger L' from the valve open position back into the valve closed position. After the valve has been opened in the manner described, the valve can be closed only by a clockwise movement of the lever carrying the finger L' past the spring detent M⁹ which is deflected by the finger L' to permit such movement. The member L is moved radially to effect the necessary outward radial movements of the finger L' by a spring L³ acting on a collar L² carried by the member L and tending to move the latter radially outward, and is given radial inward movements to move the projection L' through the section L⁸ by manual pressure against the outer end of the member L. To facilitate such manual adjustment of the member L, the latter is advantageously extended through the ball like hand gripped portion J⁴ secured to the outer end of the handle section J², so that the end of the member L may be engaged by a finger or the thumb of the operator's hand grasping the ball J⁴.

To permit the free discharge of the can contents through the valve C when the latter is in its open position, it is necessary to permit air to enter the can as the milk is discharged. To this end I provide the can with an air inlet at its top, and for sanitary reasons and to discourage attempts at unauthorized refilling of the can through the air inlet, the latter may well be of the form shown in Figs. 1, 11 and 12. As there shown a threaded part P is attached to the can wall and is formed with an axial air inlet passage P' and with one or more axial extending peripheral grooves in its outer end portion. A cap P³ is threaded on the part P and when screwed home as shown in Fig. 1, it closes the outer end of the passage P' and entirely covers the passages P² so as to effectually seal the air inlet passage against the entrance of dirt, the inlet of air, or the discharge of milk if the can is turned out of its normal upright position. Advantageously a seal wire B⁴ to be broken only at the filling station for cleaning purposes is connected to the can and extends over the cap so as to permit the latter to be backed off only far enough to uncover the inner ends of the passages P². This permits a sufficiently clean inflow of air to replace the milk discharged when the valve C is open, while preventing the entrance of dust or other foreign matter into the can and making it practically impossible to refill the can through the air inlet.

The general operation and use of the apparatus shown in Figs. 1–12 will be apparent without further description of explanation. The apparatus is practically effective for its general purposes of restricting access to the can interior or the refilling of the latter except at the filling station by persons authorized to break and reestablish the seals, and of compelling the retail distributor to thoroughly agitate the milk following each closure of the valve C and preparatory to its reopening. Furthermore these operating adjustments are obtained with a construction which is relatively simple and as rugged as conditions of use require, and which permits the ready disassemblage of the parts for as thorough cleaning as the most rigid sanitary regulations may require. While it is theoretically possible for unauthorized persons to break the seals and refill the can with milk which is inferior or has not been inspected in accordance with the prevailing inspection requirements, or to make some otherwise improper or abnormal use of the apparatus, the normal and intended use of the apparatus will be compelled in most cases, even by unscrupulous persons, because of the practical difficulties in the way of making an improper use of the apparatus, and the fear of detection in or as a result of its abnormal or improper use.

In shipping milk cans and dispensing milk from the cans, it is desirable that the can contents should be refrigerated or cooled, and in Figs. 13–15 I have illustrated a refrigerating arrangement for such a can of the general construction illustrated in Figs. 1–12. In the arrangement shown in Figs. 13–15, Q represents a container or refrigerator body or housing member adapted to be placed about a milk can A, which is supported by a refrigerator base member QA provided with a flanged seat for the lower end of the member Q. The latter provides heat insulation for the can and may be hollow walled as shown. At its upper end, which is advantageously tapered to conform to the general contour of the can A, the body Q supports a screen or grid Q' forming the bottom of a refrigerant chamber having its top and side walls formed by a cap member Q² which may be hollow walled and is seated on the top of the body Q. The arrangement shown in Figs. 13–15 was especially devised for use with a refrigerant composed of solidified carbon dioxide, or of some analogous form of so called dry ice. As the refrigerant evaporates or sublimes, the gas formed passes down into the space provided for the purpose between the outer wall of the can A and the inner wall of the housing body Q, escaping from this space through apertures Q⁴ in the can seat formed by the member QA, and apertures Q⁵ in the cylindrical outer portion of the latter which spaces the can supporting portion of member QA above the floor or support on which the latter rests. Preferably the member QA is formed with ports Q⁶ as shown, which permit gaseous refrigerant entering the hollow member QA through the ports $Q^4$ to pass up into the inverted pan shaped recess in the can bottom.

To permit the use of the cooling apparatus shown in Figs. 13–15, in cooling the can during the period in which milk is being dispensed from the latter, the can container Q and support QA provide an aperture $Q^3$ through which the valve seat member DA projects, so that the valve C may be operated by the lever member J, which is then external to the refrigerating apparatus. As shown the bottom wall of the can seat formed by the member QA is provided with uprising projections $Q^7$ suitably disposed to hold a can of smaller size than the can A adjacent the side of the refrigerator housing in which the opening $Q^3$ is formed. The projections $Q^7$ extend in the bottom recess of the can A when the latter is in the refrigerating apparatus.

In Fig. 16 I have illustrated a modified form of refrigerating apparatus comprising a can surrounding refrigerator body member QB serving as a heat insulator, and a cap member having a cylindrical body wall portion $Q^{10}$ and a cover part $Q^{11}$, which may be separable from the body part $Q^{10}$. The body portion has an internal flange portion $Q^{12}$ providing an annular trough $Q^{13}$ surrounding the upper portion of the milk can and adapted to receive ordinary ice. $Q^{14}$ represents a valved outlet for ice water formed by the melting of the ice in the trough space $Q^{13}$. The latter may be extended downward as far as conditions make desirable.

With the construction shown in Figs. 1–12 it is physically possible for an unscrupulous retail distributor to operate the valve C, as by means of a spanner wrench or the like, without making use of the lever J and the labyrinth passage or channel. Such a possibility is prohibited and other advantages are obtained by the modified construction illustrated in Figs. 17, 18 and 19, which for most purposes I consider preferable to the construction first described. In the modified construction, the discharge valve member CA may have its body portion shaped like the body portion of the previously described valve C and may be similarly connected to an agitator shaft within the can. The valve CA differs from the valve C, however, in being formed with an outer end portion $C^{10}$ square in cross sections as shown, or otherwise shaped to serve as a key extending through a correspondingly shaped passage in an operating member JA, so that the turning movements of the latter are shaped by the valve.

In the assembled construction of the apparatus, the member JA is locked against movement axially of the valve off the end portion $C^{10}$ of the latter by a member R, which serves as a locking bolt extending through a diametral passage $C^{11}$ formed in the valve end portion $C^{10}$. The member R is in the form of a tube closed at its lower end and open at its upper end and there formed with an outwardly extending flange R', which bears against the corresponding side of the valve portion $C^{10}$ which may be formed with a shallow recess as shown to receive the flange. In such condition of the apparatus, the flange R' is held against the valve part $C^{10}$ by the action of a spring $R^2$ in the lower portion of member R and acting between the lower end of the latter and a sliding part LA having a body portion extending into the member R. As shown the part R is formed with a knob $R^3$ to which the lower end of the spring $R^2$ is detachably secured and the upper end of the spring is similarly secured to a knob $L^{10}$ carried by the lower end of the member LA. The latter is provided at its upper end with a labyrinth entering projection $L^{11}$, which extends through a radial slot $J^{10}$ formed in the member JA. Advantageously, as shown, the portion of the projection $L^{11}$ received in the slot $J^{10}$ is extended radially inward to form an elongated guide rib $L^{12}$. The member JA, as shown, comprises a disk like body with a hollow radial projection $J^{11}$ at its outer side receiving the upper end of the member LA, and in the dispensing condition of the can, receiving the corresponding end of a tubular operating handle member JB, which is then suitably secured in place as by a locking screw or cotter pin $J^{12}$.

The handle member JB may be generally similar to the handle member $J^2$ of the construction first described, and includes a plunger LB projecting from the outer end of the handle member JB as does the member L in the construction first described. The plunger LB abuts against the member LA and is moved radially inward against the action of the spring $R^2$, when it is necessary to move projection L' through the passageway $M^{80}$ connecting the ends of labyrinth passages $M^1$ and $M^7$. When the handle part JB is disconnected from the part JA, the latter may be enclosed by a cap HA which is threaded on the valve casing member DA in the transportation condition of the apparatus. The cap member HA may be like the previously described cap member H, except that the member HA does not have attached to it a member corresponding to member I of the construction first described, since the locking function of the last mentioned number is unnecessary with the construction of Figs. 17, 18 and 19. The valve body member DA may be identical in form and in the manner of its connection to the can body with the member D of the construction first described, but advantageously differs therefrom in the form of the labyrinth channel and in the omission of a portion corresponding to the portion D' of the member D, which extends into the can. With the construction of Figs. 17, 18 and 19, there is no need for the locking channel $D^8$ and corresponding valve projection $C^4$ of the construction first described, and the omission of those parts facilitates the can cleaning operation.

The labyrinth channel of Figs. 17, 18 and 19 includes sections $M^1$ to $M^7$, which may be identical in form with the corresponding sections of the channel shown in Fig. 2 and includes a section $M^{80}$ corresponding to section $M^8$ of the Fig. 2 construction, but advantageously differs therefrom in being inclined away from a radial direction so that the angular extent of the passage $M^1$ is the same as that of the sections $M^3$, $M^5$ and $M^7$. The arrangement of Figs. 17, 18 and 19 includes spring detent parts $M^{90}$ and $M^{100}$, which serve the purposes of the parts $M^9$ and $M^{10}$ of the construction first described. In addition the part $M^{90}$ includes a transverse free end portion $M^{91}$, which in the normal condition of the parts forms the end wall of a radial labyrinth section $M^{12}$ connecting the end of the section $M^1$ remote from the radial section $M^2$ to the corresponding end of an arc shaped section $M^{11}$ at the inner side of the section M'. The opposite end of the section $M^{11}$ merges into the adjacent end of a section $M^{13}$ leading to the periphery of the member DA. The passages $M^{11}$, $M^{12}$ and $M^{13}$ are provided for the ready introduction of the projection $L^{11}$ into the labyrinth. Such introduction can only be effected when the valve CA as seen in Fig. 18 is turned clockwise beyond the limit of the range of movement which can be given the valve member when the latter is operatively connected to the agitator. The spring detent member $M^{90}$ is so shaped as to prevent the passage of the projection $L^{11}$ from the section $M^{80}$ into the adjacent end of the section $M^{11}$. The apparatus is preferably assembled at the filling station so that the projection $L^{11}$ is in the section $M^{11}$ and adjacent the section $M^{13}$. The retail distributor must then oscillate the valve to move the projection $L^{11}$ longitudinally of the channel section $M^{11}$ as well as through the outer channel sections $M^1$, $M^3$, $M^5$ and $M^7$ in initially opening the valve. Thereafter in reopening the valve, the projection $L^{11}$ does not reenter the channel section $M^{11}$. The inclusion of the section $M^{11}$ in the active portion of the labyrinth channel for the initial opening movement of the valve desirably increases the milk agitation preparatory to the initial opening of the valve, when such increased agitation is especially important.

Various novel features of the constructions hereinbefore described may be used with advantage in dispensing a liquid such as homogenized milk, not requiring agitation in the dispensing can prior to the discharge of the can contents or any portion thereof. In Figs. 20 and 21 I have illustrated a construction for such purposes which differs from those priviously described, primarily in the omission of the agitator and of the provisions compelling a plurality of oscillatory movements of the discharge valve between closing and opening movements of the latter. The construction shown in Figs. 20 and 21 also includes certain modifications of parts usable alike in the arrangement shown in those figures, and in arrangements previously described.

In the arrangement shown in Figs. 20–22, the valve seat member DB attached to the lower portion of the can body is shown as different from the previously described member DA in two respects, namely, in the omission of the labyrinth channel features of the member DA, and in the provision at the outer end of the member DB of a cylindrical flange $D^{10}$, which is formed with a circumferentially extending slot $D^{11}$ which is cut away at one side of the valve axis as indicated at $D^{12}$. The valve member CB need not differ in form from the valve member CA, though as shown, the outer end of the valve member CB is cylindrical. The valve member CB is normally secured in place by a locking key RA. The latter as shown is similar in form to the spring housing and locking key member R previously described. The member RA does not form a spring housing, however, but serves as a socket with internal threads RA' at its lower ends to receive a valve operating handle LC. The latter may be and is shown as a simple lever handle having a cylindrical body portion threaded at its lower end for engagement with the threads RA'. The handle member LC extends through the slot $D^{11}$ which is of a circumferential length to permit the oscillation of the handle between the valve open and the valve closed position. The outturned flange $RA^2$ at the upper end of the member RA prevents the latter from being inserted in and removed from the valve passage $C^{11}$ except when the latter is rotated into the position in which the member RA is in register with the cut away portion $D^{12}$ of the flange $D^{10}$. The valve cannot be rotated into the last mentioned position when the handle LC is attached to the valve, owing to the relative location of the slot $D^{11}$ and opening $D^{12}$. As shown the flange $RA^2$ is cut away at one side to permit both ends of the member RA to bear snugly against a radial locking surface $D^{13}$ formed on the member DA within the flange $D^{10}$, at the inner end of the latter.

In order that, in the normal condition of the apparatus, the valve CA may be spring held against its seat and prevented from rotation into the position in which the locking key RA may be withdrawn through the flange opening $D^{12}$, I make use of a spring E and anchoring shaft FA. The latter might be identical in construction and arrangement with the shaft F previously described, but as shown it differs in form and mounting from the shaft F in respect to two features, each of which is usable in lieu of the corresponding feature of the construction previously described. One of the features differentiating the shaft F from the shaft FA is that the latter is supported at its ends only. The end of the shaft FA adjacent the valve is square or of other polygonal outline in cross section so that when entered in a corresponding socket $C^{16}$ formed in the end of the valve CB, the latter serves as a pivot pin or journal extension of the shaft. The opposite end of the shaft FA is journaled in the post $A^2$ as the end of the shaft F is journaled in the post $A^3$, which is omitted in Figs. 20 and 21. In consequence of the omission of the post $A^3$, the shaft FA need be formed with but a single portion $F^4$ of reduced cross section.

The second feature of difference between the shaft arrangement of Figs. 20–22 and those previously described is in respect to the means for locking the spring E in its contracted condition when necessary to facilitate the removal of the shaft and valve for cleaning purposes. In Fig. 19, the locking provision referred to comprises a bayonet joint connection between the shaft FA and the spring abutment collar $F^{30}$. The latter differs from the corresponding collar $F^3$ previously described in that it is provided with an internal projection $F^{31}$ working in the bayonet joint groove $F^{10}$ formed in the shaft FA. The groove $F^{10}$, as is clearly shown in Fig. 20, comprises a main longitudinal portion extending from the inner end of the shaft to its junction with a short circumferential section connecting the first mentioned portion to a short parallel return portion. The latter receives the projection $F^{31}$ when the spring E is locked in its contracted condition. In the normal operative condition of the apparatus, the projection $F^{31}$ is received in the main longitudinal portion of the groove $F^{10}$.

In the assembled condition of the apparatus, the valve member CA is locked against rotation into the position in which the key member RA may be removed through the flange opening $D^{13}$ by a member S comprising a hub portion detachably secured to the shaft FA as by a thumb screw $S^1$, and provided with stop arms $S^2$, which serves the function of the stop arms $G^4$ previously described. With the arrangement shown in Figs. 20 and 21 the retail distributor is not restricted in opening and closing the discharge valve, but is prevented from tampering with the valve and from access to the interior of the can, whereby the distributor's customers are given assurance that the milk or other liquid dispensed is not subject to adulteration or contamination by the retail distributor.

With the arrangement shown in Figs. 20 and 21, the retail distributor is provided with a handle member LC, which he can insert in and remove from the valve preparatory to and after discharging the can contents. In the transportation condition of the dispensing receptacle, the end of the valve is or may be enclosed by a cover cap member which may be identical with either of the previously described cap members H and Ha. As shown the flange $D^{10}$ is notched at $D^{13}$ and the valve is formed with sockets $C^{11}$ to receive the projections $I^1$ and $I^2$ of such a locking member I as is employed in the construction shown in Figs. 1–12.

While in accordance with the provisions of the statutes I have illustrated and described the best forms of my invention now known to me, it will be apparent to those skilled in the art that changes may be made in the form of the apparatus illustrated and described herein without departing from the spirit of my invention as set forth in the appended claims and that various features of my invention may sometimes be used with advantage without a corresponding use of other features.

Having now described my invention, what I claim as new and desire to secure by Letters Patent is:

1. A can for transporting and dispensing milk having an upper filling opening and a closure therefor and having a bottom outlet including a discharge valve having a portion extending through said outlet and operable from the exterior of the can and retaining means for the valve within and accessible for adjustment in the can to permit the removal of the valve.

2. A liquid dispensing receptacle having a discharge outlet, a valve controlling said outlet, an agitator within the receptacle and operating means for opening and closing said valve including provisions compelling a plurality of movements of said agitator in moving said valve from its fully closed to its open position.

3. A liquid dispensing receptacle provided with a discharge outlet, a valve controlling said outlet mounted for oscillatory movements between open and closed positions, an agitator within the receptacle connected to said valve to share the oscillatory movements of the latter and operating means for said valve including provisions compelling a plurality of oscillatory movements of the latter insufficient to move the valve into its open position and in moving the latter from its fully closed position into its open position.

4. A liquid dispensing receptacle for storing and intermittently discharging a liquid and having a discharge outlet, a valve controlling said outlet and movable between open and closed positions, an agitator within the receptacle connected to said valve and moved by the movements of the latter and valve operating means compelling a plurality of movements of the valve toward but not into and away from the open position of the latter in the operation of the valve from its fully closed position into its open position.

5. A can for transporting and dispensing milk having an upper filling opening and a removable closure therefor and having a bottom outlet and an upper air inlet mounted in said can and having removable means mounted on said can for adjustment with respect thereto between a position in which it closes said inlet and a position in which it permits the inflow of air through said inlet as milk is discharged through said outlet, sealing provisions preventing the removal of said means and the removal of said closure without rupture of said sealing provisions, and a discharge valve mechanism associated with said outlet and including an externally operable valve and provisions normally maintaining the valve in operative relation with said receptacle but accessible from within the can for adjustment to permit the removal of the valve.

6. A liquid dispensing receptacle having a discharge outlet, a rotary valve mounted in said receptacle and controlling said outlet, and means within the receptacle normally engaging said valve and preventing its removal including a shaft detachably coupled to said valve, a bearing within said receptacle for said shaft with respect to which the shaft may be adjusted longitudinally to permit the removal of the shaft, and a spring within said receptacle normally preventing such longitudinal movement of the shaft.

7. A liquid dispensing receptacle having a discharge outlet, a rotary valve mounted in said receptacle and controlling said outlet, and means within the receptacle normally engaging said valve and preventing its removal including a shaft detachably coupled to said valve, a bearing within said receptacle for said shaft with respect to which the shaft may be adjusted longitudinally to permit the removal of the shaft, a spring within said receptacle normally preventing such longitudinal movement of the shaft, and means rendering said spring inoperative.

8. A liquid dispensing receptacle having a discharge outlet, a rotary valve mounted in said receptacle and controlling said outlet, and means within the receptacle normally engaging said valve and preventing its removal including a shaft detachably coupled to said valve, a bearing within said receptacle for said shaft with respect to which the shaft may be adjusted longitudinally to permit the removal of the shaft, a spring within said receptacle normally preventing such longitudinal movement of the shaft, and means for locking said spring under tension to render the spring inoperative to prevent such longitudinal movement of the shaft.

9. A liquid dispensing receptacle having a filling opening and a discharge outlet, a removable closure for said opening, a rotary valve controlling said outlet, a shaft within said receptacle coaxial with and detachably coupled to said valve, supporting means within and carried by said receptacle providing a bearing for said shaft and agitating means connected to said shaft.

10. The combination with a receptacle for storing and dispensing liquid, and having a lateral discharge outlet adjacent its bottom and a rotary valve mounted in said outlet and adapted for engagement and operation by valve operating means external to said receptacle, and a refrigerator housing having a receptacle chamber into and from which said receptacle with said valve mounted in its outlet may be inserted and removed and formed with a wall opening in register with said outlet when said receptacle is inserted in said housing and through which said valve may then be operated by means external to said housing, said housing also including holding means for a solidified refrigerant which passes into a fluid state as it absorbs heat, and having provisions for the discharge from said housing of the refrigerant passing into the fluid state.

11. A receptacle for the storing, transporting and dispensing a liquid provided with a lateral discharge outlet structure including a rotary valve adapted for engagement and operation by means external to said receptacle, a portion of said structure being exposed externally of said receptacle when the latter is in its dispensing condition, a cap member detachably connected to said receptacle and serving when attached thereto to enclose said portion of said outlet structure and means associated with said receptacle and cap member for locking the valve against movement into its open position when the said cap member is attached to said receptacle.

12. A liquid dispensing receptacle having a filling opening at its top and a lateral discharge outlet at its bottom providing a conical valve seat with its outer end smaller than its inner end, a plug cock engaging said seat and removable resilient means within the receptacle acting between a portion of the latter remote from said opening and said cock to hold the latter in snug engagement with its seat.

13. A liquid dispensing receptacle having a filling opening at its upper end and having a lower discharge outlet providing a seat for a rotary valve, a discharge valve engaging said seat, said valve and receptacle having portions to prevent the removal of said valve from its seat outwardly through said outlet, means within said receptacle preventing movement of said valve inwardly from its seat except when the valve is in a predetermined angular position and external valve operating means operable to move said valve between its open and closed positions, but inoperative to move said valve into said predetermined position.

14. A liquid dispensing receptacle having a filling opening at its upper end and having a lower discharge outlet providing a seat for a rotary valve, a discharge valve engaging said seat, said valve and receptacle having portions cooperating to prevent the removal of said valve from its seat outwardly through said outlet, means within said receptacle preventing movement of said valve from its seat except when the later is in a predetermined angular position, external operating means operable to move said valve between its open and closed positions but inoperative to move said valve into said predetermined position, and means accessible for adjustment from within said receptacle to permit movement of said valve into said predetermined position.

15. A liquid dispensing receptacle having a lateral discharge outlet providing a conical valve seat smaller in cross section at its outer end than at its inner end, a plug cock valve having a conical body portion engaging said seat and having an outer end portion projecting outwardly from said seat and formed with a transverse aperture, a locking member extending through said aperture and cooperating with said receptacle to prevent inward movement of said valve, said receptacle having provisions cooperating with said locking member to prevent the removal of the latter from the valve except when the latter is rotated into a predetermined position and means normally restricting the angular movement of the valve to a range including open and closed positions of the latter but excluding said predetermined position.

16. A liquid dispensing receptacle having an outlet passage shaped to provide a seat for a rotary valve, a rotary valve mounted in said seat, an agitator within the said receptacle and connected to said valve for agitating movement when the valve is oscillated, means external to said receptacle providing a labyrinth channel including a plurality of sections and a part connected to said valve to share the rotative movements of the latter including a portion extending into said channel, the latter comprising a plurality of sections through which said portion may be moved by successive to and fro angular movements of said valve through a range of movement laterally displaced from the open position of the valve and including connecting sections through which said portion may be moved following said oscillatory movements to adjust the valve into its open position and thence back into its closed position.

17. A liquid dispensing receptacle having an outlet passage shaped to provide a seat for a rotary valve, a rotary valve mounted in said seat, an agitator within the said receptacle and connected to said valve for agitating movement when the valve is oscillated, means external to said receptacle providing a labyrinth channel including a plurality of sections, a part connected to said valve to share the rotative movements of the latter including a portion extending into said channel, the latter comprising a plurality of sections through which said portion may be moved by successive to and fro angular movements of said valve through a range of movement laterally displaced from the open position of the valve and including connecting sections through which said portion may be moved following said oscillatory movements to adjust the valve into its open position and thence back into its closed position, and means associated with the last mentioned sections to prevent return movement therethrough of said portion.

18. The combination with a can for storing and shipping milk provided with an upper filling opening and a removable plug closure therefor and having a dished bottom, of a refrigerator housing for said can provided with a chamber adapted to removably receive said can and providing space for the storage of dry ice and for the circulation of cooling gas generated by the decomposition of said ice in contact with the exteral surface of said closure and of the body portion of said can, and provided with a chamber beneath said can, and formed with ports through which the last mentioned chamber is in communication with the above mentioned space and with the space beneath the dished bottom of the can and with the external atmosphere.

19. A liquid dispensing receptacle having an upper filling opening and a lower discharge outlet, a removable closure for said opening, a discharge valve normally mounted in said receptacle for operation by means external to said receptacle to permit or prevent outflow through said outlet, a liquid agitator within said receptacle normally mounted in said receptacle for operation by the movements of said valve, and means within said receptacle normally maintaining said valve and agitator for operative relation with one another and said receptacle but adjustable through said filling opening to permit the dismounting of said valve and agitator.

20. A liquid dispensing receptacle having a discharge outlet providing a seat for a rotary valve, a rotary discharge valve mounted in said seat and angularly adjustable between open and closed positions, an agitator within said receptacle connected to and moved by the movements of said valve, means including enclosed parts respectively connected to said valve and receptacle compelling a cyclic movement of said valve including a plurality of oscillatory movements toward and away from but not into the open position of the valve prior to each movement of the valve into its open position.

21. A liquid dispensing receptacle having a discharge outlet providing a seat for a rotary valve, a rotary discharge valve mounted in said seat and angularly adjustable between open and closed positions, an agitator within said receptacle connected to and moved by the movements of said valve, means including parts respectively connected to said valve and receptacle compelling a cyclic movement of said valve including a plurality of oscillatory movements toward and away from but not into the open position of the valve prior to each movement of the valve into its open position and an enclosure for said means formed with an opening for the insertion and removal of an operating member by which said valve may be given its oscillatory movements.

22. A liquid dispensing receptacle having a lateral discharge outlet providing a conical valve seat smaller in cross section at its outer end than at its inner end, a plug cock valve having a conical body portion engaging said seat and having an outer end portion projecting outwardly from said seat and formed with a transverse aperture, a locking member extending through said aperture and normally cooperating with said receptacle to prevent inward movement of said valve, and means within said receptacle normally preventing inward movement of the valve but adjustable from within said receptacle to permit inward movement of said valve when said locking member is removed from said aperture.

23. A liquid dispensing receptacle having a filling opening at its top and a discharge outlet adjacent its bottom and providing a conical valve seat with its outer end smaller than its inner end, a plug cock mounted in said seat and operable from the exterior of said receptacle, and means releasably held in said receptacle in position to act between a portion of the latter and said cock to hold the latter in said seat and disposed and adapted for manipulation for moving it from said position by an operator extending his arm for the purpose into said receptacle through said filling opening.

24. The combination with a receptacle for storing and dispensing liquid and having a discharge outlet adjacent its bottom and a valve controlling said outlet, of a refrigerator housing having a receptacle chamber into and from which said receptacle may be inserted and removed, said housing enclosing a refrigerant space surrounding said receptacle when the latter is inserted in said housing, and from which gas may escape to the atmosphere, said receptacle having provisions for the passage of a gaseous refrigerant from said space into said receptacle to replace liquid discharged from the latter through said outlet, said housing also including a space adapted to hold a solidified refrigerant which will pass into a gaseous state and fill the first mentioned space as the refrigerant absorbs heat.

25. The combination with a receptacle for storing and dispensing liquid provided with an upper filling opening and a removable plug closure therefore and having its bottom dished to provide a recess space beneath the liquid holding space in said receptacle and separated from said space by a heat conducting wall, of a refrigerator housing for said receptacle provided with a chamber adapted to removably receive said receptacle and providing space for the storage of dry ice and for the circulation of cooling gas, generated by the decomposition of said ice, in contact with the external surface of said closure and of the body portion of said receptacle and in communication with said recess space, and in communication with the external atmosphere adjacent the lower end of said receptacle for the escape of cooling gas.

26. A liquid dispensing receptacle having an upper filling opening and a lower discharge outlet, a removable closure for said opening, a discharge valve normally mounted in said receptacle for operation by means external to said receptacle to permit or prevent outflow through said outlet, a liquid agitator within said receptacle normally mounted in said receptacle for operation by the movements of said valve, and means within said receptacle normally maintaining said valve and agitator for operative relation with one another and said receptacle but adjustable through said filling opening to permit the dismounting of said valve and agitator, and a non-return valve preventing flow into said receptacle through said outlet when said discharge valve is mounted in said receptacle and is in position to permit outflow through said outlet.

JESSE P. HUBBELL.